Figure 1:
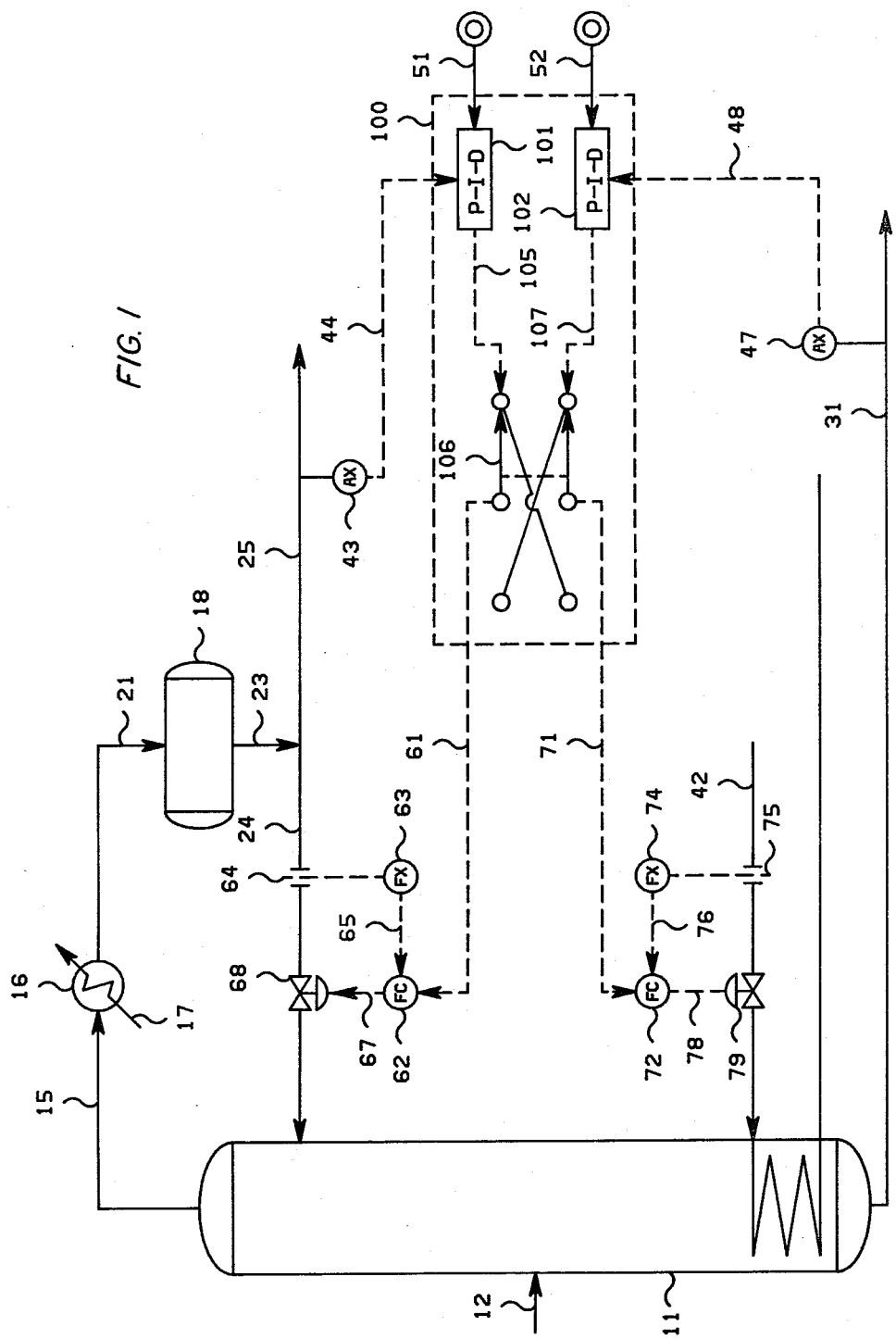

United States Patent [19]

Jensen

[11] 4,438,499
[45] Mar. 20, 1984

[54] FRACTIONAL DISTILLATION PROCESS CONTROL

[75] Inventor: Bruce A. Jensen, Bartlesville, Okla.

[73] Assignee: Phillips Petroleum Company, Bartlesville, Okla.

[21] Appl. No.: 307,453

[22] Filed: Oct. 1, 1981

Related U.S. Application Data

[62] Division of Ser. No. 184,845, Sep. 8, 1980, Pat. No. 4,316,255.

[51] Int. Cl.³ .................. G06F 15/46; G05B 11/42; B01D 3/42
[52] U.S. Cl. ................... 364/501; 196/132; 202/160; 364/157; 364/172
[58] Field of Search ............. 364/500, 501, 502, 148, 364/152, 153, 156, 157, 160–163, 172; 196/132; 202/160; 203/1–3, DIG. 18; 62/21, 37

[56] References Cited

U.S. PATENT DOCUMENTS

| 3,018,230 | 1/1962 | Morgan | 364/501 X |
| 3,259,554 | 2/1966 | Constantikes | 203/3 |
| 3,967,937 | 7/1976 | Hobbs | 196/132 |
| 4,265,263 | 5/1981 | Hobbs | 364/157 X |
| 4,346,433 | 8/1982 | Rutledge | 364/157 X |

*Primary Examiner*—Joseph F. Ruggiero

[57] ABSTRACT

In a fractional distillation process in which the designation of the primary product stream changes, the desired composition of the primary product stream and a secondary product stream are maintained without losing automatic control of the process for an extended period of time while the controllers controlling the process are retuned for the new operating conditions. Two sets of tuning constants are available to each controller and these tuning constants are automatically switched as required by the designation of the primary product stream.

6 Claims, 2 Drawing Figures

4,438,499

FRACTIONAL DISTILLATION PROCESS CONTROL

This application is a divisional of my application, Ser. No. 184,845, filed Sept. 8,1980 U.S. Pat. No. 4,316,255.

This invention relates to fractional distillation process control. In one aspect this invention relates to method and apparatus for controlling the product compositions in a fractional distillation process where the designation of the primary product may change.

In a typical fractional distillation process at least an overhead product stream and a bottoms product stream are removed from the fractional distillation column. Center draw streams are also sometimes removed from the fractional distillation column. One of these streams will generally be designated as the primary product stream due to the value of that stream or other operating conditions. The desired composition of the primary product stream will generally be maintained by manipulating a primary process variable such as the heat provided to the fractional distillation column. The desired composition of the secondary product stream will generally be maintained by manipulating a secondary process variable such as the flow rate of the external reflux to the fractional distillation column. Analysis of both the product streams is typically utilized to generate the required control signals. Each analysis is generally provided to a controller which compares a set point to the analysis to derive a control signal for manipulating the process variables.

During the normal course of operation of a fractional distillation process, the definition of the primary product stream and the secondary product stream may change due to changing product pricing, downstream operation or upstream operation. When this occurs, it is desirable to be able to continue to control the composition of the redesignated primary product stream by manipulating the primary process variable. To accomplish this it is necessary to switch the controller which is provided with the analysis of the redesignated primary product stream to control of the primary process variable. At the same time, the controller provided with the analysis of the redesignated secondary product stream is switched to control the secondary process variable. This necessitates the retuning of each of the controllers.

In the past, retuning of the controllers has generally required that the controllers must be taken off control. This is totally undesirable because automatic control of the process is lost. It is thus an object of this invention to provide method and apparatus for controlling the product compositions in a fractional distillation process where the designation of the primary product may change in such a manner so as to avoid the problem of losing automatic control of the process for the time period required to retune the controllers.

In accordance with the present invention, method and apparatus is provided whereby both of the controllers are tuned as both primary and secondary controllers. As used herein, the term "primary controller" refers to the controller manipulating the primary process variable and the term "secondary controller" refers to the controller manipulating the secondary process variable. The unused tuning constants are stored in memory. When the primary product designation changes, the tuning constants for the controllers are also automatically changed so as to provide automatic tuning of the controllers without the loss of automatic process control.

Figure 2:
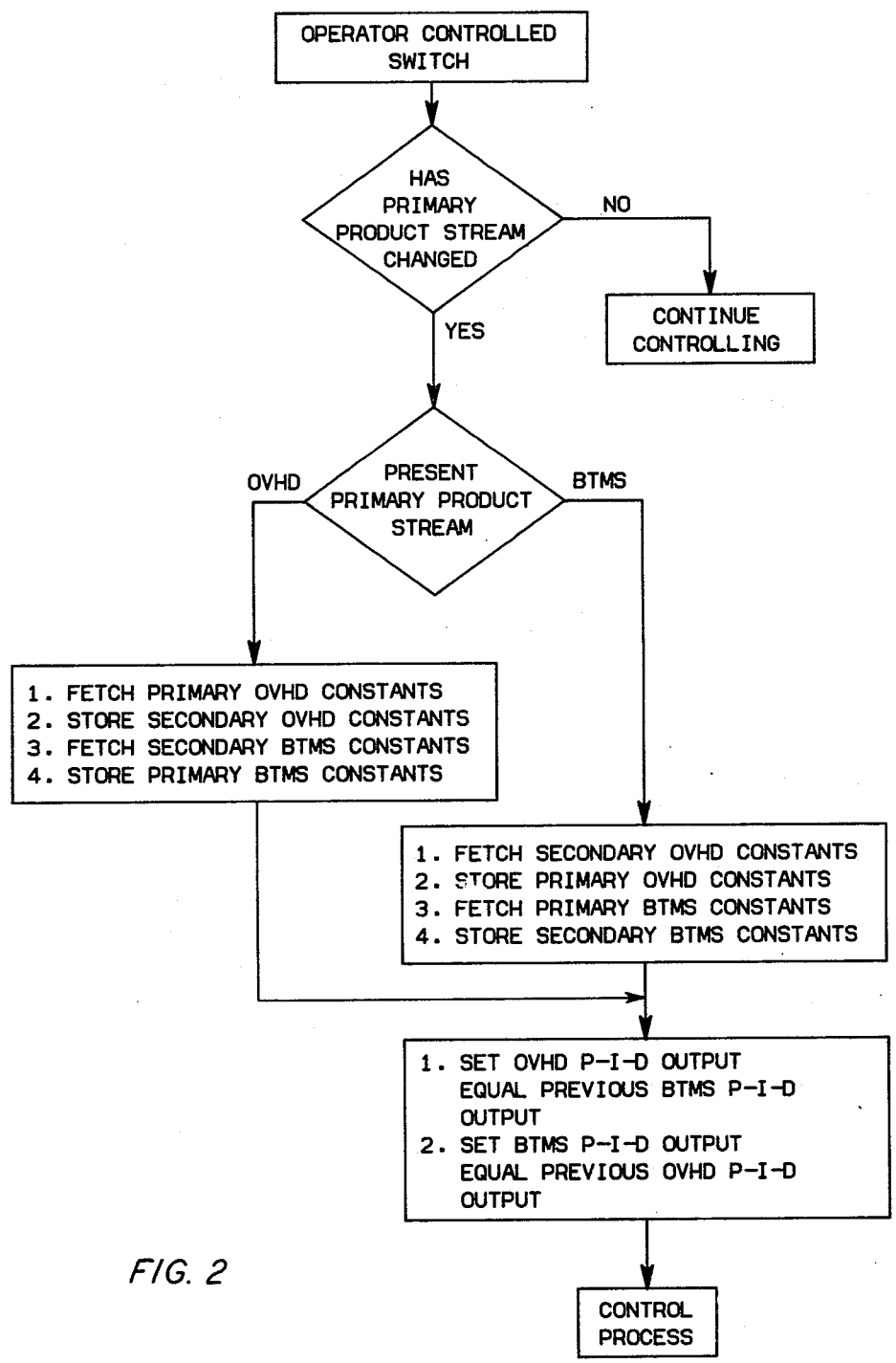

Other objects and advantages of the invention will be apparent from the foregoing brief description of the invention and from the claims as well as from the detailed description of the drawings in which:

FIG. 1 is a diagrammatic representation of a fractional distillation process with the associated control system of the present invention; and FIG. 2 is a flow diagram for the computer logic utilized to implement the automatic changing of the controllers.

The invention is illustrated and described in terms of a fractional distillation process in which the flow of heat to the fractional distillation process is the primary process variable and the flow rate of the external reflux to the fractional distillation column is the secondary process variable. The invention is also illustrated and described in terms of a fractional distillation process in which the overhead product stream and the bottoms product stream are the product streams of interest. Thus, if the bottoms product stream is the primary product stream then the desired composition of the bottoms product stream is maintained by manipulating the heat flowing to the fractional distillation column. In like manner if the overhead product stream is the primary product stream then the desired composition of the overhead product stream is maintained by manipulating the heat flowing to the fractional distillation column. The flow rate of the external reflux is utilized to maintain the desired composition of the secondary product stream.

Although the invention is described in terms of a specific fractional distillation column using specific primary and secondary process variables and specific product streams, it should be recognized that a number of different process variables could be controlled to maintain desired product compositions. Fluid levels and product flows are other typical parameters which are often manipulated to maintain desired product compositions. Also, the composition of other product streams could be controlled.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Conversion of signals from analog to digital form or digital to analog form is also not illustrated because this is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to implement the proportionalintegral-derivative controllers and the switching functions. Analog computers or other types of computing devices could also be used in the invention. The digital computer is preferably an OPTROL 7000 process computer system manufactured by Applied Automation, Inc., Bartlesville, Oklahoma.

Both the analog and digital controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention. The operation of proportional-integral-derivative controllers is well known in the art. The output control signal of a proportional-integral-derivative (P-I-D) controller may be represented as $$S = K_1 E + K_2 \int E \, dt + K_3 (dE/dt)$$

where
S = output control signals;
E = difference between two input signals; and
$K_1$, $K_2$ and $K_3$ = constants.

Tuning of a controller generally refers to adjusting the relationship of the constants associated with the controller output. Thus, for a proportional-integral-derivative controller the values of $K_1$, $K_2$ and $K_3$ are generally referred to as the tuning constants.

Techniques for tuning a controller are well known in the art. There are many methods for determining the optimum tuning constants, depending on the nature and complexity of the process. For process loops that readily achieve a new final value after a disturbance, the open loop step response method works well for determining the coefficients in the P-I-D equation. The basic approach is to open the loop, so that no feedback signal occurs, and record the response of the controlled variable versus time at the instant of and following a step change in the controller output.

The curve thus obtained is known as a process reaction curve. From this curve two parameters are estimated. These parameters are:

reaction rate Rr—the maximum slope of the curve, and time delay Lr—the time from initiation of the step change until the process variable deviates from the initial value.

Equations, which are known as the Ziegler-Nichols open loop tuning equations, relate the parameters Lr and Rr to the tuning coefficients.

These relations are:
$K_1 = 1.2 \, \Delta m / Lr Rr$
$K_2 = 2.4 \, \Delta m / Rr$
$K_3 = 0.6 \, \Delta m / Rr$
where $\Delta m$ is the magnitude of the step change made, and other parameters are defined above.

Referring now to FIG. 1, there is illustrated a fractional distillation column 11. A feedstream is supplied to the fractional distillation column 11 through conduit means 12. An overhead stream is withdrawn from the fractional distillation column 11 through conduit means 15 and is provided to the heat exchanger 16. The heat exchanger 16 is provided with a cooling medium flowing through conduit means 17. The condensed fluid stream from the heat exchanger 16 is provided to the overhead accumulator 18 through conduit means 21.

Liquid in the accumulator 18 is withdrawn through conduit means 23. A fluid flowing through conduit means 23 is provided as an external reflux to the fractional distillation column 11 through the combination of conduit means 23 and 24. The fluid flowing through conduit means 23 is also provided as the overhead product stream from the fractional distillation column 11 through the combination of conduit means 23 and 25.

A bottoms product stream is withdrawn from the fractional distillation column 11 through conduit means 31. Heat is supplied to the fractional distillation column 11 by fluid flowing through conduit means 42.

The analyzer transducer 43, which is preferably a chromatographic analyzer, provides an output signal 44 which is representative of the analysis of the overhead portion stream flowing through conduit means 25. Signal 44 may be a plurality of signals representative of the concentration of a plurality of components in the overhead product stream but for the sake of illustration signal 44 will be considered to be representative of the concentration of one component in the overhead product stream. Signal 44 is provided from the analyzer transducer 43 to the digital computer 100 and is specifically provided to the P-I-D controller 101.

In like manner the analyzer transducer 47 which is also preferably a chromatographic analyzer provides a signal 48 which is representative of an analysis of the bottoms product stream flowing through conduit means 31. Again, for the sake of illustration, signal 48 will be considered to be representative of the concentration of one component in the bottoms product stream. Signal 48 is provided from the analyzer transducer 47 as an input to computer means 100 and is specifically provided to the P-I-D controller 102.

Both the P-I-D controller 101 and the P-I-D controller 102 are provided with operator supplied set points. The set point signal 51 is representative of the desired concentration of a component in the overhead product stream. In like manner the set point signal 52 is representative of the desired concentration of a component in the bottoms product stream.

The P-I-D controller 101 compares signals 44 and 51 and establishes an output signal 105 which is responsible to the difference between signals 44 and 51. Signal 105 is provided on the switch 106 which is a digital implementation of a double pole double throw. In the illustrated switching configuration, in which the bottoms product stream is designated as the primary product stream, signal 105 is provided as signal 61 to the flow controller 62.

Flow member 64 in combination with the flow transducer 63, which is operably located in conduit means 24, provides an output signal 65 which is representative of the flow rate of the external reflux flowing through conduit means 24. Signal 65 is provided as a second input to the flow controller 62. In response to signals 61 and 65, the flow controller 62 establishes an output signal 67 which is responsive to the difference between signals 61 and 65. Signal 67 is provided in the pneumatic control valve 68 which is operably located in conduit means 24. The pneumatic control valve 68 is manipulated in response to signal 67 to thereby maintain signal 44 substantially equal to signal 51 for the switching configuration illustrated.

The P-I-D controller 102 establishes an output signal 107 which is responsive to the difference between signals 52 and 48. Signal 107 is provided to the software switch 106. In the switching configuration illustrated, signal 107 is provided as signal 71 to the flow controller 72.

The flow transducer 74 in combination with the flow sensor 75, which is operably located in conduit means 42, provides an output signal 76 which is representative of the flow rate of the heating fluid flowing through conduit means 42. Signal 76 is provided as a second input to the flow controller 72. In response to signals 71 and 76, the flow controller 72 establishes an output signal 78 which is responsive to the difference between signals 71 and 76. Signal 78 is provided as a control signal to the pneumatic control valve 79 which is operably located in conduit means 42. The pneumatic control valve 79 is manipulated in response to signal 78 to thereby maintain signal 48 substantially equal to signal 52 for the switching configuration illustrated.

As has been previously stated, the heat supplied to the fractional distillation column is the primary process variable while the flow rate of the external reflux is the secondary process variable. With the bottoms product designated as the primary product, the switching configuration is set up so as to allow the P-I-D controller 102 to manipulate the heat supplied to the fractional distillation column.

If the overhead product stream flowing through conduit means 25 is designated as the primary product stream then the switching configuration is changed to enable signal 105 to be provided as signal 71 to the flow controller 72 while signal 107 is provided as signal 61 to the flow controller 62. In this manner, the P-I-D controller 101 is placed in control of the heat provided to the fractional distillation column and again the desired primary product stream composition will be maintained by manipulating the primary process variable.

The P-I-D controller 101 and 102 must have two sets of tuning constants. The first set would be utilized when the P-I-D controller 101 is controlling the external reflux and the P-I-D controller 102 is controlling the heat supplied to the fractional distillation column 11. The second set of tuning constants would be utilized when the P-I-D controller 101 is manipulating the heat supplied to the fractional distillation column 11 while the P-I-D controller 102 is manipulating the flow rate of the external reflux. Since two sets of tuning constants are required, it is necessary to tune both controllers for both configurations.

Preferably this is accomplished by entering a zero for the proportional gain, integral gain and derivative gain into the P-I-D controller blocks 101 and 102. One configuration is chosen such as the configuration illustrated in FIG. 1. The P-I-D controllers 101 and 102 are then tuned by conventional techniques as would normally be done during the startup of a process. When the tuning of the controllers is complete and the results are satisfactory, the other configuration is chosen by changing the configuration of the software switch 106. The previously determined constants are stored in a first temporary controller storage area and zeros are entered from a second temporary controller storage area into both the P-I-D controller 101 and the P-I-D controller 102. The controllers are again tuned by conventional techniques in the second configuration. If the second configuration provides for control of the primary process variable by the controller receiving the analysis of the primary product stream then the second configuration may be utilized for process control. If the primary product stream changes, the switching configuration is automatically changed and the second set of tuning constants are stored in the second temporary controller storage. The first set of tuning constants are then provided to the P-I-D controllers 101 and 102 and control is continued automatically. Extensive down time of the control system is eliminated since it is not necessary to take the P-I-D controllers 101 and 102 off line for an extensive period of time to retune the controllers for the new configuration.

A flow diagram for the computer logic utilized to implement the switching of the controller is illustrated in FIG. 2. Essentially an operator can control by a switch the designation of the primary product stream. The computer logic then checks to determine whether the designation of the primary product stream has changed. If the designation has not changed then the control system as implemented simply continues. If the designation has changed then the computer logic determines which of the product streams is the present primary product stream. The tuning constants for the P-I-D controllers are fetched or stored depending on which one of the product streams in the primary product stream. The output of each of the controllers is then set equal to the previous output of the other controllers so as to provide for a bumpless transfer. Process control is then continued.

The invention has been described in terms of a preferred embodiment as illustrated in FIGS. 1 and 2. Specific components used in the practice of the invention is illustrated in FIG. 1 such as flow sensors 64 and 75; flow transducers 63 and 74; flow controllers 62 and 72; and pneumatic control values 68 and 79 are each well known, commercially available control components such as are illustrated at length in Perry's *Chemical Engineer's Handbook*, 4th Edition, Chapter 22, McGraw-Hill. A suitable analyzer 43 and 47 is the OPTICHROM 2100 computer operated analyzer manufactured by Applied Automation, Inc., Bartlesville, Okla.

While the invention has been described in terms of the presently preferred embodiment, reasonable variations and modifications are possible by those skilled in the art, within the scope of the described invention and the appended claims. Modifications such as using different types of controllers controlling different process variables or controlling different product streams is within the scope of the present invention.

That which is claimed is:

1. A method for controlling a fractional distillation process comprising the steps of:
   establishing a first signal representative of the concentration of at least one component in a first product stream withdrawn from said fractional distillation process;
   establising a second signal representative of the desired concentration of said at least one component in said first product stream;
   applying said first signal and said second signal to a first controller means to thereby establish a third signal which is responsive to the difference between said first signal and said second signal;
   establishing a fourth signal representative of the concentration of at least one component in a second product stream withdrawn from said fractional distillation process;
   establishing a fifth signal representative of the desired concentration of said at least one component in said second product stream;

supplying said fourth signal and said fifth signal to a second controller means to thereby establish a sixth signal responsive to the difference between said fourth signal and said fifth signal;

establishing primary first tuning constants for said first controller means for use when said first controller means controlling a primary process variable;

establishing secondary first tuning constants for said first controller means for use when said first controller means in controlling a secondary process variable;

establishing primary second tuning constants for said second controller means for use when said second controller means is controlling said primary process variable;

establishing secondary second tuning constants for said second controller means for use when said second controller means is controlling said secondary process variable;

designating said first product stream as a primary product stream;

supplying said primary first tuning constants to said first controller means;

storing said secondary first tuning constants in memory;

supplying said secondary second tuning constants to said second controller means;

storing said primary second tuning constants in memory;

manipulating said primary process variable in response to said third signal; and manipulating said secondary process variable in response to said sixth signal.

2. A method in accordance with claim 1 additionally comprising the steps of:

changing the designation of the primary product stream from said first product stream in said second product stream;

automatically supplying said secondary first tuning constants from memory to said first controller means and storing said primary first tuning constants in memory;

automatically supplying said primary second tuning constants to said second controller means and storing said secondary second tuning constants in memory;

automatically changing the manipulation of said primary process variable in response to said third signal to manipulation in response to said sixth signal; and automatically changing the manipulation of said secondary process variable in response to said sixth signal to manipulation in response to said third signal.

3. A method in accordance with claim 1 wherein said first product stream is an overhead product stream, wherein said second product stream is a bottoms product stream, wherein said primary process variable in the rate at which heat is supplied to said fractional distillation process, wherein said secondary process variable is the flow rate of the external reflux to said fractional distillation process, wherein said third signal is representative of the desired rate at which heat should be supplied to said fractional distillation process in order to maintain a desired overhead product stream composition and wherein said step of manipulating said primary process variable in response to said third signal comprises:

establishing a seventh signal representative of the actual rate at which heat is being supplied to said fractional distillation process;

comparing said third signal and said seventh signal and establishing an eighth signal responsive to the difference between said third signal and said seventh signal; and manipulating the rate at which heat is supplied to said fractional distillation process in response to said eighth signal.

4. A method in accordance with claim 3 wherein said sixth signal is representative of the flow rate of said external reflux required to maintain a desired bottoms product composition and wherein said step of manipulating said secondary process variable in response to said sixth signal comprises;

establishing a ninth signal representative of the actual flow rate of said external reflux;

comparing said sixth signal and said ninth signal and extablishing a tenth signal responsive to the difference between said sixth signal and said ninth signal; and manipulating the flow rate of said external reflux in response to said tenth signal.

5. A method in accordance with claim 2 wherein said first product stream is an overhead product stream, wherein said second product stream is a bottom product stream, wherein said primary process variable is the rate at which heat is supplied to said fractional distillation process, wherein said secondary process variable is the flow rate of the external reflux to said fractional distillation process, wherein said sixth signal is representative of the desired rate at which heat should be supplied to said fractional distillation process in order to maintain a desired bottoms product composition and wherein said step of manipulating said primary process variable in response to said sixth signal comprises;

establishing a seventh signal representative of the actual rate at which heat is being supplied to said fractional distillation process;

comparing said sixth signal and said seventh signal and establishing an eighth signal responsive to the difference between said sixth signal and said seventh signal; and manipulating the rate at which heat is supplied to said fractional distillation process in response to said eighth signal.

6. A method in accordance with claim 5 wherein said third signal is representative of the flow rate of said external reflux required to maintain a desired overhead product composition and wherein said step of manipulating said secondary process variable in response to said third signal comprises:

establishing a ninth signal representative of the actual flow rate of said external reflux;

comparing said third signal and said ninth signal and establishing a tenth signal responsive to the difference between said third signal and said ninth signal; and manipulating the flow rate of said external reflux in response to said tenth signal.

* * * * *